Nov. 9, 1926. 1,606,085

A. J. KNOWLES

VEHICLE BUMPER

Filed June 30, 1924

Inventor,
Arthur J. Knowles.
By Jordon & Stewart
Attorneys

Patented Nov. 9, 1926.

1,606,085

UNITED STATES PATENT OFFICE.

ARTHUR J. KNOWLES, OF WILMINGTON, DELAWARE, ASSIGNOR TO WILLIAM H. FRYER, OF WILMINGTON, DELAWARE.

VEHICLE BUMPER.

Application filed June 30, 1924. Serial No. 723,302.

This invention has particular reference to those forms of spring bumpers which are adapted to be mounted on the front and rear of motor vehicles as a protection against collision. It is intended to provide a bumper which shall include two resilient members, one in the form of a metallic bar and the other a surrounding flexible housing for the bar, both elements of which operate to reduce the force of impact of objects which may be struck.

It is an object of this invention to so assemble this device that the central resilient member may be cheaply constructed and the necessity for giving it an elaborately finished appearance may be avoided. A device may be constructed in accordance with my invention in an economical and advantageous way. It lends itself to ease of transportation and assembly and presents a pleasing and durable appearance.

It frequently happens that bumpers of this class are subjected to glancing blows due to their advanced position in front of the vehicle. Such blows rarely if ever come in contact with the vehicle proper and much annoyance is caused by this unnecessary projection of the bumper beyond the vehicle proper. It is a further object of my invention to provide a device which shall have the maximum degree of yielding from a side or glancing blow, permitting the obstruction to be passed where this can successfully be done without the obstruction coming in contact with the proximate parts of the vehicle.

Further advantages resulting from these improvements will be evident from the following description of one preferred form of my invention and as illustrated in the accompanying drawing, in which.

Figure 1:
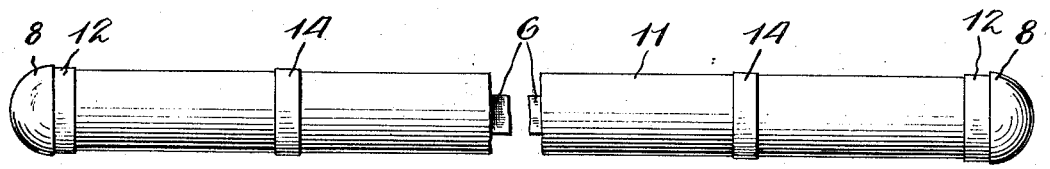
Figure 1 is a side elevation.

As illustrating one form which my invention may take, in its practical embodiment, I have shown in the drawing a resilient spring bar 6, which it is intended shall occupy a vertical plane transverse to the front or rear of the vehicle. This bar is loosely held in spacing disks 7, 7 which are substantially opposite the spring horns of the vehicle, to which it is intended to attach the bumper. The slots in the disks 7, 7 are sufficiently large to permit the easy sliding from side to side of the spring bar 6. This sliding movement is controlled by the connection of the spring bar 6 to the end portions of the outer flexible housing member. It is to be understood that the bar 6 is made of spring metal, although the same need not be highly finished or polished, as it at no time is visible.

At each end of the bar 6 there is provided a cap 8, semi-spherical on one side and having a cylindrical boss 9 on the other side. This boss 9 is cut away on opposite sides of a bridge 10 which in turn is grooved to receive one end of the bar 6 in sliding engagement. In a sense, this cap may be considered as an abutment for the end of the bar 6. The boss 9 is of the same diameter as the disk 7.

A flexible housing or tube 11, of diameter substantially that of the members 7 and 9, is provided of flexible and resilient material, for example, rubber laminated structure of fabric or cord construction analogous to that of rubber vehicle tires. This housing or tube is substantially of the same length as the bar 6. The tube is drawn over the spacing disks 7 and surrounding the bar 6 with the ends of the tube 11 about the bosses 9 of the caps 8. An air inlet valve 11$^a$ is set in the rear side wall of the tube 11.

Spring clips or straps 12, 12 are applied around the ends of the tube 11. These serve to clamp the tube tightly against the bosses 9, 9 and within the diameter of the spherical ends of the caps 8 to insure a finished appearance.

Figure 3:
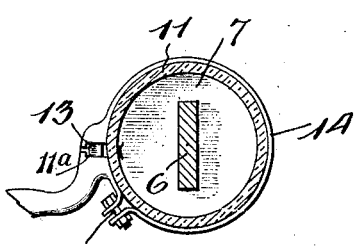
Fig. 3 is a cross section on the line 3—3 of Fig. 2.
Figure 4:
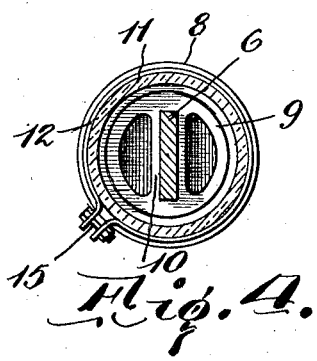
Fig. 4 is a vertical cross section on the line 4—4 of Fig. 2.

Bracket members 13, as shown in Fig. 3, are used to attach the bumper to the spring horns of the vehicle. These brackets terminate in spring clips or clamps 14 which are applied around the intermediate portions of the tube and opposite the spacing disks 7, 7. The conventional bolt and nut 15 are used for tightening the spring clips 12 and 14.

The mode of constructing and assembling the above mentioned parts will be readily apparent. The tube 11 is then inflated with air or like elastic fluid through valve 11$^a$ in a manner similar to that in which a vehicle tire is inflated. This will permit a certain degree of longitudinal sliding movement between the bar 6 and its supporting disks 7, 7. This degree of sliding will be limited by the extensible character of the tube section 11 between the clips 12 and 14.

In operation the bumper will serve to cushion the shock of collision by means, primarily, of the resistance offered by the inflated tube 11. In case the strain is too great to be entirely absorbed by the resilience of the tube 11, the flat spring bar 6 will itself serve as a bumper. Both the flexible tube 11 and the bar 6 will of course be restored to normal position as soon as the obstruction is removed.

Figure 2:
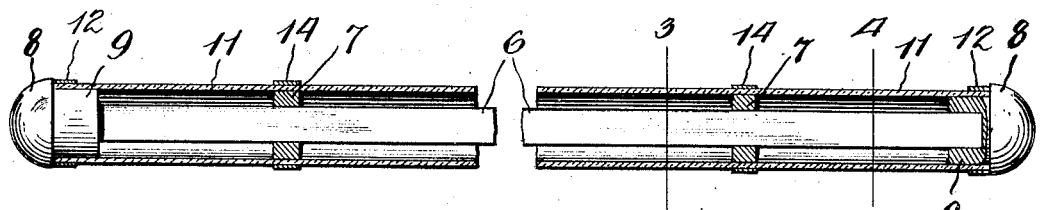
Fig. 2 is a vertical, longitudinal section.

One of the novel advantages in a bumper of this type resides in the fact that the bar 6 is supported indirectly from the frame of the vehicle. This is due to the sliding engagement between the disks 7 and the bar 6. Consequently, as the disks are held in clamped engagement by the brackets, the bar 6 may slide longitudinally of the bumper until restrained by the limit of the extensibility of the portion of the tube 11 between the spring clips 12 and 14. Thus, if in Fig. 2, a glancing blow is received on the left hand cap 8, the force will be transmitted through the length of the bar 6 and will be received by the right hand cap 8, which serves as an abutment. The right hand cap 8 is in turn held by the flexible tube 11 only. As this tube stretches, it allows the left hand cap 8 to yieldingly resist the force of the obstruction and in many instances to permit the obstruction to glance off without damaging the vehicle. This also prevents the rigid interlocking of the bumper with parts of a colliding vehicle. As soon as the obstruction has passed, the bumper will, of course, spring back to its normal position, due to the resilience of the member 11.

The above description of one form of my invention indicates a preferred structure, the details of which may however be varied within the scope of the invention as defined in the following claims.

What I claim is:

1. A vehicle bumper comprising a resilient member, spacing members loosely mounted thereon, an inflatable tube carried by said spacing members, and means clamping said tube to the spacing members.

2. A vehicle bumper comprising a resilient bar, a plurality of spacing members loosely mounted thereon, a cap mounted on each end of said bar, an inflatable tube and means for clamping said tube on said spacing members and caps.

3. A vehicle bumper comprising a resilient bar, a plurality of spacing members loosely mounted thereon, a cap mounted on each end of said bar, an inflatable tube, means for clamping said tube around said caps, and supports adapted to be clamped around the tube in the planes of the spacing members.

4. A vehicle bumper comprising a bar, a plurality of spacing members loosely mounted thereon, a cap mounted on each end of said bar, an extensible member around said caps, and supporting means adapted to be clamped around the extensible member in the planes of the spacing members.

5. A vehicle bumper comprising a bar, slotted disks loosely mounted on said bar in spaced relation to each other and to the ends of the bar, a recessed cap receiving each end of the bar and having a diameter corresponding to that of the disks, an inflatable tube extending between the caps and surrounding the disks and means for clamping said tube on said disks and caps.

6. A vehicle bumper comprising a bar, spacing members loosely mounted thereon, and a resilient housing for the bar carried by said spacing members.

7. A vehicle bumper comprising an inflatable flexible housing, supporting means therefor, and a reinforcing member mounted with restrained longitudinal movement within the housing.

8. A vehicle bumper comprising a hollow flexible member, supporting means therefor, and a reinforcing member mounted with restrained longitudinal movement within the flexible member.

In testimony whereof, I have hereunto affixed my signature.

ARTHUR J. KNOWLES.